United States Patent [19]
LaRochelle

[11] 3,959,403
[45] May 25, 1976

[54] PROCESS FOR MAKING SILARYLENESILANEDIOL, SILARYLENESILOXANEDIOL AND SILARYLENESILOXANE-POLYDIORGANOSILOXANE BLOCK COPOLYMERS

[75] Inventor: Ronald W. LaRochelle, Schenectady, N.Y.

[73] Assignee: General Electric Company, Schenectady, N.Y.

[22] Filed: Mar. 31, 1975

[21] Appl. No.: 563,784

[52] U.S. Cl. .......................... 260/825; 260/46.5 P; 260/448.2 D
[51] Int. Cl.² .......................................... C08L 83/00
[58] Field of Search ................ 260/28, 825, 46.5 P, 260/448.2 D

[56] References Cited
UNITED STATES PATENTS

| | | |
|---|---|---|
| 3,338,870 | 8/1967 | Nitzsche et al. ............... 260/46.5 P |
| 3,350,350 | 10/1967 | Nitzsche et al. ............... 260/46.5 P |

*Primary Examiner*—Lewis T. Jacobs
*Attorney, Agent, or Firm*—William A. Teoli; Joseph T. Cohen; Jerome C. Squillaro

[57] ABSTRACT

A method is provided for making silarylenesilanediol, silarylenesiloxanediol and block copolymers of silarylenesiloxane and polydiorganosiloxane, useful as high-strength silicone rubber. Silarylenesiloxanediols can be prepared by heating an aqueous mixture of a dialkoxy silarylene and a water miscible organic solvent such as acetone, followed by distilling volatiles from the mixture. A mixture of the silarylenesilanediol or silarylenesiloxanediol, a silanol-terminated polydiorganosiloxane, organic solvent and a condensation catalyst can then be heated to effect removal of water of condensation to produce silarylenesiloxane block copolymer.

20 Claims, No Drawings

PROCESS FOR MAKING SILARYLENESILANEDIOL, SILARYLENESILOXANEDIOL AND SILARYLENESILOXANE-POLYDIORGANOSILOXANE BLOCK COPOLYMERS

A method is provided for making silarylenesilanediol and silanol-terminated polysilarylenesiloxane from dialkoxysilarylene in an aqueous water miscible organic solvent mixture. Intercondensation can be effected between the aforementioned silanol-terminated silarylene materials and silanol-terminated polydiorganosiloxane to produce high-strength silicone rubber.

Prior to the present invention, one method for making silarylenesilanediol was to treat various silarylenesilane compounds of the formula

(1)

where X is radical selected from halogen, $C_{(1-8)}$ alkoxy and hydrogen, R is a divalent aromatic organic radical, and $R^1$ is a monovalent organic radical with sodium hydroxide or potassium hydroxide in alcohol and water. Inasmuch as up to two moles or more of alkali hydroxide, per mole of the silarylenesilane of formula (1) were required, neutralization of the mixture had to be resorted to before silarylenesilanediol was isolated. A typical procedure used to make silarylenesilanediol from silarylenesilane dihydride by the strong base method is shown by Merker U.S. Pat. No. 3,202,634 in Column 6, Lines 1–25. Another strong base procedure which can be used to produce silarylenesilanediol involves the use of m-phenylene bis(dimethylethoxysilane) as shown in L. W. Breed et al.. in the J. Organometal Chem., 9 (1967), on Page 191. In addition to requiring neutralization of the base before the silarylenesilanediol can be isolated, a purification step is often required to eliminate salts from the mixture. As a result, the strong base technique for making silarylenesilanediol is undesirable in many respects. Improved techniques for making silarylenesilanediol and silarylenesiloxane-polydiorganosiloxane block copolymers useful as high-strength silicone rubber are constantly being sought.

The present invention is based on the discovery that valuable results can be achieved without the use of a strong base to make silarylenesilanediol and silanol-terminated polysilarylenesiloxane. The silarylenesilanediol and silarylenesiloxanediol can be used to prepare high-strength silicone rubber in the form of silarylenesiloxane-polydiorganosiloxane block copolymer. An aqueous mixture of a water miscible organic solvent can be used with a dialkoxy silarylene of the formula,

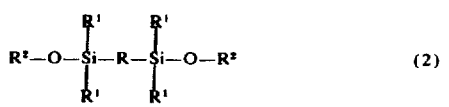
(2)

at temperatures of about 0°C to 100°C where R and $R^1$ are as previously defined, and $R^2$ is a $C_{(1-8)}$ alkyl radical. Neutralization of strong base, and isolation and removal of undesirable salt byproducts from the resulting silanol-terminated silarylenesiloxane, of the formula,

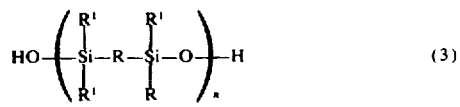
(3)

is thus eliminated, where n is an integer equal to 1 to 100 and R and $R^1$ as previously defined. As used hereinafter, the term "silanol-terminated silarylenesiloxane" can include silarylenesilanediol and silanol-terminated polysilarylenesiloxane. The silanol-terminated silarylenesiloxane of the formula (3) can be intercondensed with silanol-terminated polydiorganosiloxane to produce high-strength silicone rubber.

It has been found that valuable results also can be achieved in making silanol-terminated silarylenesiloxane materials useful for making high-strength silicone rubber, by using certain acid catalysts as defined hereinafter in combination with dialkoxysilarylene of formula (2) and an aqueous, water miscible organic solvent mixture. Although valuable results are achieved by such acid catalyzed method, a higher degree of oligomerization, or partial polymerization of the silarylenesilanediol can result. The removal or neutralization of the acid catalyst, prior to using the silarylenesilanediol mixture in combination with the silanol-terminated polydiorganosiloxane is generally desirable.

There is provided by the present invention, a liquid phase method for making block copolymers of silarylenesiloxane and diorganopolysiloxane which comprises, 1. refluxing a liquid phase mixture containing as essential ingredients, dialkoxysilarylene, of formula (2), water, and a water miscible organic solvent, 2. stripping the mixture of (1) of volatiles under reduced pressure to a temperature of about 100°C to produce a product consisting essentially of silanol-terminated silarylenesiloxane of formula (3), 3. effecting intercondensation between silanol-terminated silarylenesiloxane of formula (3) and the silanol-terminated polydiorganosiloxane in the presence of an inert organic solvent, and a silanol intercondensation catalyst which does not exhibit siloxane bond rearrangement, and 4. recovering from the mixture of (3), silarylenesiloxane-polydiorganosiloxane block copolymer.

Included by the dialkoxysilarylene of formula (2) are, for example,

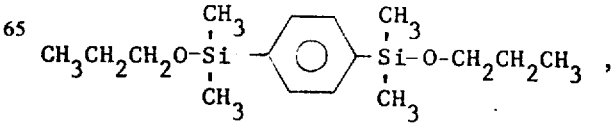

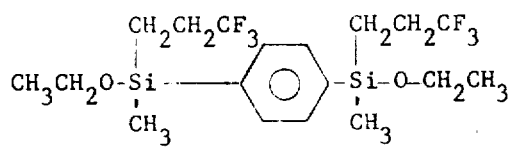

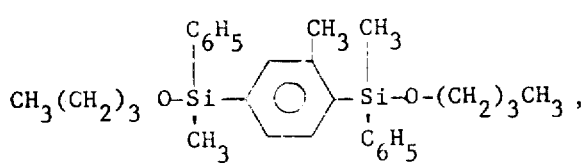

etc.

Radicals included by R of formula (2), for example divalent aromatic hydrocarbon radicals such as phenylene, tolylene, xylylene, napthalene, 4,4'-biphenylene, 4,4'-diphenylene ether, etc.; halogenated divalent aromatic hydrocarbon radicals such as chlorophenylene, bromonapthalene, etc. Included by the monovalent organic radicals ($R^1$) of formula (2) are, for example, alkyl radicals such as methyl, ethyl and propyl; aryl radicals such as phenyl and napthyl; alkaryl radicals such as tolyl and xylyl; unsaturated aliphatic radicals such as vinyl, allyl, propynyl; and halogenated radicals such as chlorophenyl and 3,3,3-tri-fluoropropyl. Included by the $R^2$ radicals of formula (2) are, for example, $C_{(1-8)}$ alkyl radicals such as methyl, ethyl, propyl, butyl, etc. In formula (2), where R and $R^1$ can be more than one radical respectively, these radicals can be the same or different as previously defined.

Included by the silanol-terminated polydiorganosiloxane which can be employed in the practice of the invention are, for example,

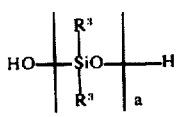

(4)

where $R^3$ is a $C_{(1-13)}$ organic radical selected from the class consisting of monovalent hydrocarbon radicals, for example, aryl radicals such as phenyl, tolyl, xylyl, etc.; $R^1$ radicals as previously defined, and a is an integer equal to from 5 to 10,000 inclusive, preferably an average of 10 to 1,000 inclusive.

These silanol-terminated polydiorganosiloxanes, such as polydimethylsiloxane, can be made by reacting hydrolyzable diorganosiloxane with a controlled amount of water in the presence of a suitable acid or base catalyst to tailor the viscosity of the polymer to the desired range. Polydiorganosiloxane which can be employed to make the silanol-terminated polydiorganosiloxanes can also be made by conventional equilibration procedures by heating a cyclic polydiorganosiloxane, for example, a cyclic polysiloxane containing from 3 to 8 chemically combined diorganosiloxy units, such as dimethylsiloxy units, methylphenylsiloxy units, methylvinylsiloxy units, etc., in the presence of a basic catalyst, such as potassium hydroxide. In order to convert the polydiorganosiloxane to silanol-terminated polydiorganosiloxane having a particular viscosity, water can be added to the polydiorganosiloxane and the mixture heated between 150° to 200°C for 8 hours or less. The mixture can then be decatalyzed and stripped to the desired viscosity.

In the practice of the invention, a mixture of dialkoxysilarylene, water and a water miscible solvent, is agitated to effect the hydrolysis of the dialkoxysilarylene to silarylenesilanediol. The hydrolysis mixture thereafter is stripped of volatiles to produce silanol-terminated silarylenesiloxane of formula (2). Silarylenesiloxanepolydiorganosiloxane block copolymer can be made by effecting contact between silanol-terminated polydiorganosiloxane with an inert organic solvent and an intercondensation catalyst as previously described. The mixture can then be heated and water of condensation continuously removed.

In making the silanol-terminated silarylenesiloxane of formula (3) referred to hereinafter as the "silarylenesilanediol" there can be employed a mixture of from 0.5 to 10 parts of water miscible organic solvent, per part of the dialkoxysilarylene.

Temperatures in the range of between 0°C up to refluxing the mixture can be used along with agitation such as stirring. Suitable water miscible organic solvents, which can be used are, for example, acetone, acetonitrile, tetrahydrofuran, dioxane, methylethyl ketone, etc.

Experience has shown that the use of 0.01 to 5% by weight of an acid catalyst based on the weight of dialkoxysilarylene can facilitate the rate of formation of the silarylenesilanediol. However, it has been found that the value of $n$ in formula (3) can be substantially increased in particular instances. Acid catalysts which can be used to enhance the hydrolysis of the dialkoxysilarylene include, for example, mineral acids such as sulfuric acid, hydrochloric acid, nitric acid, etc., acidic clays. Further examples of acid catalysts which can be used are, for example, certain neutral amine acid catalysts disclosed in Hyde U.S. Pat. No. 3,160,601, as defined below, which have been acidified with an organic carboxylic acid, such as acetic acid, formic acid, etc.

After the mixture has been agitated over a period of about 2 hours or less, the mixture can be stripped of volatiles under reduced pressure. In instances where the mixture is heated free of acid catalyst, it has sometimes been found desirable to repeat the hydrolysis of the dialkoxysilarylene an additional time with further amounts of the water miscible organic solvent and water. The mixture then can be refluxed for an additional period of time such as 2 hours or less and stripped of volatiles as previously described. The residue thereafter can be treated with an inert organic solvent such as, for example, toluene to form an azeotrope and distill out the last traces of water.

Silarylenesiloxane block copolymer can be made in accordance with the practice of the invention by making an organic solvent mixture of the silarylenesiloxanediol having from about 5 to 90 percent by weight organic solvent mixed with a suitable amount of silanol-terminated polydiorganosiloxane of formula (4) hereinafter referred to as the "silanol fluid." An amine-acid condensation catalyst, as defined below, can be added at from 0.1 to 1.0% by weight of total reactants as shown by formulas (2) and (4) to effect block copolymer formation. Depending upon the block size and weight percent of the polydiorganosiloxane desired in the final block copolymer, the block length of the silanol fluid can vary widely as shown by formula (4). The condensation reaction can be performed at a temperature in the range of from 25° to 125°C along with agitation and can proceed over a period of from 1 to 24 hours. Organic solvents which can be used are, for example, benzene, toluene, xylene, etc.

Another procedure for making the silarylenesiloxane block copolymer in the method of the present invention is to effect an in-situ hydrolysis of the dialkoxysilarylene in an aqueous miscible organic solvent mixture as defined above, in the presence of the silanol fluid with or without the presence of the acid catalyst. The procedure is essentially the same as described above, requiring initially the agitation and refluxing of the hydrolysis mixture in the presence of the silanol fluid followed by stripping of volatiles therefrom. If desired, the hydrolysis procedure involving refluxing with additional water and water miscible organic solvent followed by stripping under reduced pressure can be employed. Condensation of the resulting in-situ formed silarylenesiloxanediol in the presence of the silanol-terminaed polydiorganosiloxane can proceed after an amine-acid condensation catalyst is added. If desired, a suitable inert organic solvent can be added as previously described to effect the formation and separation of a water-organic solvent azeotrope.

Suitable amine-acid condensation catalysts which can be used are shown in Hyde, U.S. Pat. No. 3,160,601, Merker, U.S. Pat. No. 3,202,634 and Falk, U.S. Pat. No. 3,032,530 and include, for example, amine salts of phosphoric acid and amine salts of carboxylic acid. Condensation catalysts are amine-type salts which can be prepared by reacting ammonia, an organic amine, or an amine organo silicone compound with a phosphoric or carboxylic acid. Included by these amine salts are, for example, di-2-ethylhexylamine acetate, triphenylsilpropylamine formate, trimethylsiloxydimethylsilhexylamine hexoate, 4,4'-diaminobenzophenone butyrate, 4,4'-diaminobenzophenone butyrate, 4,4'-diamino diphenyl ether deconoate, tri-n-butyl-amine acrylate, 3,4-dichloroaniline caproate, aniline octanoate, didodecylamine, o-chlorophenoxyacetate, ethyl-amine, 3-ethoxypropionate, diethylene triamine monooleate, diisopropylamine palmitate, trimethylamine stearate, benzylhydrazine hexoate, 2,5-dimethylpiperazine octoate, di(octadecylamine) sebacate, ethylenediamine di-hexoate, tetraethylene pentamine diphosphate, 1,2-aminopropane phenylphosphate and ammonium stearate.

Recovery of the silarylenesiloxane block copolymer can be achieved by standard techniques such as by allowing the condensation reaction mixture to cool and dissolving the block copolymer in a suitable organic solvent such as chloroform, methylene chloride, benzene, toluene, xylene, etc. The resulting polymer solution can be poured into a precipitating solvent such as methanol.

The rubbery solid can thereafter be isolated and dried over a period of 1 to 24 hours at temperatures in the range of 25° to 150°C.

The silarylenesiloxane block copolymer of the present invention can be blended with 1 to 100 parts of reinforcing silica filler such as fume silica, per 100 parts of block copolymer. Some of the block copolymers of the present invention having aliphatically unsaturated organic radicals such as vinyl attached to silicon by carbon-silicon linkages, can be blended with peroxide curing catalysts such as benzoyl peroxide and dicumyl peroxide, to produce curable extrudable mixtures useful as wire insulation. However, these vinyl containing block copolymers are to be distinguished from the vinyl containing block copolymers of copending application (RD-7178) of Ronald W. LaRochelle et al., filed concurrently herewith and assigned to the same assignee as the present invention containing a critical mole percent range of chemically combined organoalkenylsiloxy units.

In order that those skilled in the art will be better able to practice the invention, the following examples are given by way of illustration and not by way of limitation. All parts are by weight.

EXAMPLE 1

A mixture of 11 parts of p-bis(dimethyl-n-propoxysilyl)benzene, 10 parts of water, and about 29 parts of acetone was refluxed and stirred for 2 hours. Reduced pressure was used to remove the volatiles. To the remaining solid residue, there was added an additional 7 parts of water and about 29 parts of acetone. The resulting mixture was again refluxed for 2 hours followed by distilling volatiles therefrom. Additional volatiles were removed by vacuum stripping. There was then added 8 parts of toluene to the resulting solid residue. The final traces of water were azeotroped from the resulting silphenylenesiloxanediol. Based on method of preparation, there was obtained 8 parts of silphenylenesiloxanediol. This corresponded to a quantitative yield. The identity of the final product was confirmed by NMR.

A mixture of the above-described silphenylenesiloxanediol and toluene at a solid level of between 70–75 percent was mixed with 11 parts of a silanol-terminated polydimethylsiloxane having an average molecular weight of about 2800. There was also added to the mixture 0.095 parts of tetramethylguanidine-di-2 ethylhexoate. The mixture was heated at 110°C and water of condensation was continuously removed. After about 6½ hours of heating, the resulting product was allowed to cool and dissolve in chloroform and therefore precipitated into methanol. There was obtained a rubbery solid which was isolated and dried overnight in a vacuum oven. Based on method of preparation, the average silphenylene block length was at least 10 and the average dimethylsiloxane block length was at least 40. The resulting block copolymer also had an intrinsic viscosity in toluene of 1.3 dl/g at 25°C and contained 21 mole percent of silphenylene.

The above block copolymer is found to have a tensile (psi) of about 1500, an elongation (%) of about 750 and a hardness (Shore A) of about 70. In the unfilled and uncured state it can be extruded onto a copper wire as an insulator.

EXAMPLE 2

A mixture of 5.43 parts of p-bis(dimethyl-n-propoxysilyl)benzene, 4.8 parts of a silanol-terminated polydimethylsiloxane having an average of about 52 dimethylsiloxy units, 4 parts of an aqueous 0.2% solution of trifluoroacetic acid was stirred at 120°C. This distillate temperature quickly rose to 88°C and then rose slowly to 98°C. As the temperature of the distillate began to fall, an additional 4 parts of the 0.2% aqueous trifluoroacetic acid solution was added to the reaction mixture. There was then added to the mixture about 4 parts of toluene to facilitate the separation of excess water over a period of 1.5 hours at 115°C. Additionally, there was added to the mixture, 0.5 part of tetramethylguanidine-di-2-ethyl hexanoate. The mixture was then refluxed at 110°C for 6 hours under partial vacuum. There was obtained an amber product when the mixture was allowed to cool to room temperature. It was dissolved in methylene chloride. The viscous solution was then precipitated into methanol to yield a tough light amber material. The material was dried for several hours at 70°C under vacuum. There was obtained a 90 percent yield of product. Based on method of preparation and NMR analysis, the product was a silphenylene-siloxane block copolymer having an intrinsic viscosity in toluene at 25°C of 0.9 dl/g. The silphenylenesiloxane block has an average of at least about 4 and the polydimethylsiloxane block has an average of at least about 16 units.

The above silphenylenesiloxane-polydimethylsiloxane block copolymer is milled with fume silica to produce a blend having about 40 parts of fume silica, per 100 parts of block copolymer. The blend is then extruded onto a copper wire to produce an insulated conductor having valuable insulating characteristics.

EXAMPLE 3

The procedure of Example 1 is repeated to produce a silphenylene-siloxane block copolymer "A" having an intrinsic viscosity of 1.9 in toluene at 25°C. The block copolymer has about 20 mole percent of silphenylene units and the balance of polydimethylsiloxane units. There is an average of at least 10 units in the silphenylene block and an average of at least 40 units in the polydimethylsiloxane block.

A silphenylene-siloxane block copolymer "M" is prepared following the procedure of Merker, J. Poly Sci A2, 31 (1964) also having 20 mole percent of silphenylene units. The intrinsic viscosity of block copolymer B is found to be 1.5 in toluene at 25°C.

The following results are also found where A shows the block copolymer made by the acetone method and M shows the block copolymer made by the Merker method, "T" is tensile (psi), E is elongation (%) and H is hardness (Shore A).

|  | A | M |
|---|---|---|
| Mole % |  |  |
| Silphenylene | 20 | 20 |
| T | 1,530 | 1,450 |
| E | 650 | 800 |
| H | 68 | 72 |

The above results show that the acetone method of the present invention results in the production of block copolymer substantially equivalent to the block copolymer made by Merker's method. However, the requirement of the strong base technique producing undesirable salt by-products upon neutralization are eliminated.

EXAMPLE 4

A mixture of 0.62 part of di-n-propoxysilylsilphenylene, 0.47 part of a silanol-terminated polydimethylsiloxane having an average of about 6 dimethylsiloxy units, 0.085 part of a Filtrol 20 acid clay, and 0.5 part of water was stirred at 118°C. Within 8 minutes, the temperature of the distillate rose to about 86°C. The mixture was then diluted with about 20 parts of chloroform and filtered and concentrated. The resulting oil was then catalyzed with 1.0 part of tetramethylguanidine tris-trifluroacetate and 140°–150°C for 1.5 hours. There was obtained an 85 percent yield of a product following the recovery procedure of Example 2. Based on method of preparation, the product was a silphenylenesiloxane-polydimethylsiloxane block copolymer having about 27 mole percent of silphenylenesiloxane units and 73 mole percent of polydimethylsiloxane units.

The above block copolymer is blended with fume silica to produce an extrudable blend exhibiting valuable insulating characteristics suitable for making insulated copper wire conductors.

EXAMPLE 5

A mixture of 2.72 parts of di-n-propoxysilphenylene, 2.40 parts of a silanol-terminated polydimethylsiloxane having an average of about 27 dimethylsiloxy units, 2.0 parts of water, about 4 parts of acetonitrile, 0.25 part of tetramethylguanidine di-2-ethyl hexanoate, and 0.25 part of formic acid was stirred at 25°C for 22 hours. The mixture was then heated to 125°C to distill out all volatiles. There was then added to the mixture, about 2 parts of toluene, excess water was then azeotroped from the reaction mixture. There was then added 0.25 part of tetramethylguanidine di-2-ethylhexanoate. The mixture was heated to 110°C for 6½ hours. During the heating, water of reaction was constantly removed under reduced pressure. A polymeric product was obtained which was dissolved in toluene and precipitated into methanol. After vacuum drying, the resulting polymeric product at 70°C, there was obtained a tough polymeric material at about 85 percent yield. Based on method of preparation, the product was a silphenylenesiloxane-polydimethylsiloxane block copolymer having about 20 mole percent of silphenylene siloxane units and 80 mole percent of polydimethylsiloxane units, having an intrinsic voscosity in toluene of 1.52 dl/g at 25°C.

One hundred parts of the above block copolymer is blended with 40 parts of fume silica to produce an extrudable blend. The blend is extruded onto a copper wire to produce an insulated copper conductor.

Although the above examples show only a few of the very many variables included in the practice of the method of the present invention, it should be understood that the present invention is directed to a much broader method for making silarylenesilanediol, silanol-terminated polysilarylenesiloxane, and to silarylenesiloxanepolydiorganosiloxane block copolymers.

EXAMPLE 6

A mixture of 11 parts of p-bis(dimethyl-n-propoxysilyl)benzene, 8 parts of water, 30 parts of acetone and 0.5 part concentrated sulfuric acid. The mixture was stirred at 25°C for 4 hours. Then 100 parts of water were added to crystallize the product. A tube with a glass frit was placed in the mixture under vacuum. The mixture of water soluble components and by-products was removed. To the white solid residue were added 30 parts acetone, 5 parts water and 0.5 part concentrated sulfuric acid. The solution was stirred at 25°C for 2 hours. Then 100 parts of water were added to crystallize the solid. The water soluble components and by-products were then removed as before. To the wet product consisting essentially of silphenylene silanediol were added 10 parts of toluene and 11.5 parts of a 63 centistokes disiloxanol fluid. The mixture was heated to 110°C and the excess water of hydrolysis was removed by toluene-water azeotrope. To the solution were added 0.10 part of tetramethylguanidine di-2-ethylhexoate catalyst. The mixture was polymerized over a 6.5 hour period of 110°C.

The polymer was cooled and dissolved in 100 parts of CHCl₃. The polymer solution was isolated by precipitation into 300 parts of methanol. Based on method of preparation the polymer consisted of 20 mole percent polysilphenylene siloxy units with a minimum average block length of 10 and 80 mole percent polydimethyl-siloxy units with a minimum block length of 40.

Although the above examples show only a few of the very many variables included in the practice of the method of the present invention, it should be understood that the present invention is directed to a much broader method for making silarylenesilanediol, silanol-terminated polysilarylenesiloxane, and to silarylenesiloxanepolydiorganosiloxane block copolymers.

What I claim as new and desire to secure by Letters Patent of the United States is:

1. A method for making silarylenesiloxane of the formula

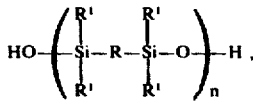

which method comprises
1. agitating a mixture consisting essentially of a dialkoxysilarylene of the formula

water, and a water miscible organic solvent at a temperature in the range of about 0° to 100°C, and thereafter
2. stripping the mixture of (1) of volatiles under reduced pressure to a temperature of up to about 100°C where $n$ is an integer equal to 1 to 100 inclusive, R is a divalent aromatic organic radical, $R_1$ is a monovalent organic radical and $R^2$ is a $C_{(1-8)}$ alkyl radical.

2. A method in accordance with claim 1, where an acid catalyst is used in the mixture.

3. A method in accordance with claim 1, where the dialkoxysilarylene is p-bis(dimethyl-n-propoxysilylbenzene).

4. A method in accordance with claim 1, where the water miscible organic solvent is acetone.

5. A method in accordance with claim 1, for making silphenylenesilanediol.

6. A liquid phase method for making block copolymers of silarylenesiloxane and diorganopolysiloxane which comprises,
1. agitating a liquid phase mixture containing as essential ingredients, dialkoxysilarylene of the formula

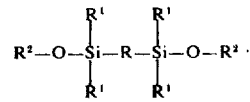

water, and a water miscible organic solvent, at a temperature in the range of from 0° to 100°C,
2. stripping the mixture of (1) of volatiles under reduced pressure to a temperature of about 100°C to produce a product consisting essentially of silanol-terminated silarylenesiloxane of

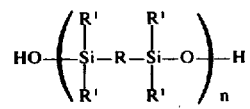

3. effecting intercondensation between the silanol-terminated silarylenesiloxane and a silanol-terminated polydiorganosiloxane in the presence of an inert organic solvent, and
4. recovering from the mixture of (3) a silarylenesiloxane polydiorganosiloxane block copolymer, where R, $R^1$, $R^2$ and n are as previously defined in claim 1.

7. Method as in claim 6, where the water miscible organic solvent is acetone.

8. Method as in claim 6, where the dialkoxysilarylene is p-bis(dimethyl-n-propoxysilyl)benzene.

9. A method in accordance with claim 6, where the polydiorganosiloxane is a polydimethylsiloxane.

10. A method in accordance with claim 6, where intercondensation of the silanol-terminated silarylenesiloxane and the polydiorganosiloxane is effected with an amine-acid condensation catalyst.

11. A method in accordance with claim 6, where the silanol-terminated silarylenesiloxane is a silarylenesilanediol.

12. A method in accordance with claim 6, where the silanol-terminated silarylenesiloxane is formed in the presence of the silanol-terminated polydiorganosiloxane.

13. A method in accordance with claim 6, where the reaction in Step 1 is effected in the presence of an acid catalyst.

14. A liquid phase method of making silarylenesiloxane polydiorganosiloxane block copolymer which comprises,
1. refluxing a liquid phase mixture containing as essential ingredients, dialkoxysilarylene of the formula,

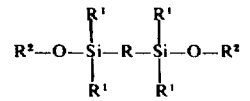

water, a water miscible organic solvent, an acid catalyst, and a silanol-terminated polydiorganosiloxane of the formula

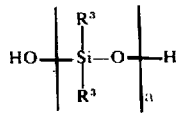

2. stripping the mixture of (1) of volatiles under reduced pressure to a temperature of about 100°C to produce a mixture consisting essentially of a silanol-terminated silarylenesiloxane of the formula,

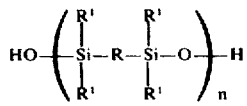

and the silanol-terminated polydiorganosiloxane of Step 1,
3. effecting intercondensation between the silanol-terminated silarylenesiloxane and the silanol-terminated polydiorganosiloxane,
4. recovering from the mixture of (3), a silarylenesiloxane polydiorganosiloxane block copolymer, where R, $R^1$, $R^2$ and n are as defined in claim 1, $R^3$ is selected from $R^1$ and $C_{(1-13)}$ organic radicals and a is an integer equal to from 5 to 10,000 inclusive.

15. A method in accordance with claim 14, where the water miscible organic solvent is acetone.

16. A method in accordance with claim 14, where the silanol-terminated polydiorganosiloxane is a silanolterminated polydimethylsiloxane.

17. A method in accordance with claim 14, where the dialkoxysilarylene is p-bis(dimethyl-n-propoxysilylbenzene).

18. A method in accordance with claim 14, where acid catalyst is trifluoroacetic acid.

19. A liquid phase method for making block copolymers of silarylenesiloxane and polydiorganopolysiloxane which comprises,
1. agitating a liquid phase mixture containing as essential ingredients, dialkoxysilarylene, water, a water miscible organic solvent and an effective amount of an acid clay catalyst at a temperature of from 0° to 100°C,
2. filtering the mixture of (1) to effect the removal of the acid clay catalyst,
3. stripping the resulting filtrate of (2) of volatiles at temperatures up to 100°C to produce a silarylenesiloxane,
4. effecting intercondensation of the silarylenesiloxane of (3) with a silanol-terminated polydiorganosiloxane to produce block copolymer.

20. A liquid phase method for making silarylenesiloxane-polydiorganosiloxane block copolymers, which comprises,
1. agitating a liquid phase mixture containing as essential ingredients, dialkoxysilarylene, water, a water miscible organic solvent and an effective amount of a mineral acid at a temperature of from 0° to 100°C,
2. adding water to the resulting mixture in an amount to effect precipitation of silarylenesiloxane from the mixture,
3. recovering the silarylenesiloxane from the resulting mixture,
4. azeotroping residual water from the recovered silarylenesiloxane,
5. effecting intercondensation of the silarylenesiloxane of (4) with a silanol-terminated polydiorganosiloxane to produce block copolymer.

* * * * *